United States Patent
Lü et al.

(10) Patent No.: US 7,077,249 B2
(45) Date of Patent: Jul. 18, 2006

(54) DRUM BRAKES WITH INTERCONNECTED MULTI-DEGREES-OF-FREEDOM SHOES

(75) Inventors: Zhenhua Lü, Beijing (CN); Wenming Han, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 10/168,918

(22) PCT Filed: Sep. 28, 2001

(86) PCT No.: PCT/CN01/01461
§ 371 (c)(1),
(2), (4) Date: Jun. 24, 2002

(87) PCT Pub. No.: WO02/36980
PCT Pub. Date: May 10, 2002

(65) Prior Publication Data
US 2003/0155190 A1 Aug. 21, 2003

(30) Foreign Application Priority Data
Sep. 29, 2000 (CN) .......................... 00124983 A

(51) Int. Cl.
*F16D 51/16* (2006.01)

(52) U.S. Cl. ...................... 188/325; 188/78; 188/79.51; 188/196 P

(58) Field of Classification Search ............. 188/78, 188/331, 250 R, 250 C, 79.51, 196 R, 325, 188/326, 327–330, 106 F, 135, 136, 140 R, 188/361, 362, 70 R, 335, 70 B, 79, 365, 188/323, 341, 342, 140 A
See application file for complete search history.

(56) References Cited

U.S. PATENT DOCUMENTS

| 1,458,730 A | * | 6/1923 | Schmitz ........................ 188/79 |
| 1,616,583 A | * | 2/1927 | La Brie ................... 188/250 C |
| 1,622,133 A | * | 3/1927 | Dodge ..................... 188/250 C |

(Continued)

FOREIGN PATENT DOCUMENTS

| EP | 001321690 A1 | * | 6/2003 |
| GB | 2005368 | | 4/1979 |
| JP | 10/148226 | | 6/1998 |
| JP | 11-82567 | | 3/1999 |

OTHER PUBLICATIONS

Translations of submitted JP 10–148226 and JP 11–82567.*
Search Report—PCT/CN01/01461.

*Primary Examiner*—Douglas C. Butler
(74) *Attorney, Agent, or Firm*—Patterson, Thuente, Skaar & Christensen, P.A.

(57) ABSTRACT

This invention is a new type of drum brake and its variants for motor vehicles, the shoe mechanism assembly of which has at least one set of interconnected shoe mechanism and automatic adjusting mechanism of brake clearance. The interconnected shoe mechanism consists of two interconnected composite shoes of multiple degrees of freedom. Each composite shoe consists of a shoe and a driving lever. The shoe is jointed to the driving lever with a cylindrical pin or a elliptical pin matching with a cylindrical hole or a spherical joint, and the driving lever is pivoted on the backplate of brake with a cylindrical pin or a elliptical pin matching with a cylindrical hole or a spherical joint. The automatic clearance adjusting mechanism is fixed on the backplate and interconnected with the driving lever.

20 Claims, 10 Drawing Sheets

U.S. PATENT DOCUMENTS

| | | | | |
|---|---|---|---|---|
| 1,630,060 A | * | 5/1927 | McConkey | 188/324 |
| 1,634,369 A | * | 7/1927 | Dodge | 188/250 C |
| 1,636,004 A | * | 7/1927 | La Brie | 188/250 C |
| 1,664,197 A | * | 3/1928 | Dodge | 188/250 C |
| 1,667,375 A | * | 4/1928 | Dodge | 29/525.06 |
| 1,689,767 A | * | 10/1928 | Bendix et al. | 188/79 |
| 1,756,985 A | * | 5/1930 | McConkey | 188/323 |
| 1,901,695 A | * | 3/1933 | Bendix | 188/140 A |
| 2,140,385 A | * | 12/1938 | Hunt et al. | 188/106 A |
| 2,202,661 A | * | 5/1940 | Jeffery | 188/325 |
| 2,828,835 A | * | 4/1958 | Brisson | 188/78 |
| 2,875,860 A | * | 3/1959 | Eckardt et al. | 188/79.52 |
| 3,357,526 A | * | 12/1967 | Thirion | 188/326 |
| 3,563,348 A | * | 2/1971 | Frost | 188/342 |
| 4,350,230 A | | 9/1982 | Ingram | |
| 4,700,816 A | | 10/1987 | Rath | |
| 5,499,705 A | * | 3/1996 | Ide | 192/107 T |
| 2003/0155190 A1 | * | 8/2003 | Lu et al. | 188/79 |

\* cited by examiner

DRUM BRAKES WITH INTERCONNECTED MULTI-DEGREES-OF-FREEDOM SHOES

TECHNICAL FIELD OF THE INVENTION

This invention is a new type of drum brake and its variants for motor vehicles, which serve to decelerate or stop motor vehicles.

DESCRIPTION OF THE PRIOR ART

The operation performances of wheel brakes are the key to meet the braking performance requirements of motor vehicles, but the working effectiveness of the two kinds of friction brakes, drum brakes and disc brakes, widely used in modern vehicles is quite complicated. An important difference between drum brakes and disc brakes is that drum brakes have a degree of self-energization, so drum brakes have higher shoe factors (2~7 in general), i.e., the ratio of the total friction force on the shoes to the applied shoe tip load. They can therefore be fitted to heavier cars without the need for an external servo. In contrast, disc brakes have much lower shoe factors (only about 0.7). Pads of higher coefficient of friction are continually being developed for disc brakes, but, even so, on heavy cars high pipeline pressures are necessary, especially if light pedal efforts are required. If the servo unit were to fail on these vehicles, the pedal effort might be insufficient to provide adequate deceleration of the vehicle. The limited amount of human effort available to operate the handbrake has meant that drum brakes, because of their self servo effect, are more effective than disc brakes as handbrakes, and this is the reason for their retention on the rear wheels of most vehicles. The lack of self-energization in disc brakes means they are less sensitive to changes of coefficient of friction than drum brakes and are thus inherently more stable.

On the thermal side, although the cooling rates of discs are better than drum, their dimensions and weights are often so smaller that despite their improved cooling they generally operate at higher temperature than drums. Disc brakes have the ability to withstand these higher temperatures because of their better stability which is partly intrinsic and partly due to increased resistance to 'fade' from improved friction materials. The better stability of disc brakes has also enable a more consistent frictional behavior to be obtained from the front brakes and has given a better braking performance from high speeds. At higher operating temperatures, however, the wear rate of friction materials increases, and pad life is reduced. In contrast, drums suffer more from expansion effects than discs in which changes in the radius of action can decrease the torque output of a brake. As the temperature of the drum increases, it expands to a greater radius than the lining. This results in contact being made in the central area of the lining, giving a lower shoe factor and a reduction in torque output. This is termed 'mechanical fade'.

To sum up, the merits of drum brakes are the demerits of disc brakes, and the merits of disc brakes are the demerits of drum brakes.

SUMMARY OF THE INVENTION

The objectives of this invention are to provide a new type of drum brake and its variants for motor vehicles, which have excellent braking performance in capacity and stability owing to its uniform pressure distribution over the friction surface between drum and linings, better resistance to capacity fade with decreasing coefficient of fiction due to increasing temperature or humidity, longer life span of shoes, uniform and constant clearance between drum and linings, as well as high shoe factor. In other words, they possess the primary merits of both drum brakes and disc brakes.

The shoe mechanism assembly of the new type drum brakes has at least one set of interconnected shoe mechanism and automatic adjusting mechanism of brake clearance. The interconnected shoe mechanism consists of two composite shoes of multiple degrees of freedom. A composite shoe consists of a shoe and a driving lever. The shoe is jointed to the driving lever with a cylindrical pin or a elliptical pin or a spherical joint and can rotate about the joint (this joint will be called shoe joint below). The driving lever is pivoted on the backplate with a cylindrical pin or a elliptical pin or a spherical joint (this joint will be called anchor joint below). The two driving levers of the two composite shoes are arranged in the directions opposite to each other, namely, the tip of one driving lever and the anchor joint of the other driving lever are in the same side, and there is a certain distance between the two anchor joints. The two composite shoes are interconnected at the adjacent ends of the shoes by means of a slide joint mechanism to keep the two shoes having the same radial displacement at the joint and not interfering in the circumferential direction. The automatic clearance adjusting mechanism is fixed on the backplate and interconnected with the driving lever of the composite shoe.

The interconnected shoe mechanism can be of two, three or four degrees of freedom, respectively, which depends on the kinds of the anchor joint and shoe joint and whether two driving levers of the two interconnected composite shoes are also interconnected or not. The details are as follows.

(1) If the anchor joint and shoe joint are all cylindrical pins and there exists a joint linkage between two driving levers of the two interconnected composite shoes, the interconnected shoe mechanism has two degrees of freedom; however, if there is not any linkage between the two driving levers, the interconnected shoe mechanism has three degrees of freedom.

(2) If the anchor joint and shoe joint are spherical joint and cylindrical pin respectively and there is a joint linkage between two driving levers of the two interconnected composite shoes, the interconnected shoe mechanism has three degrees of freedom, including a degree of freedom of roll about axis connecting the two spherical anchor joints; however, if there is not any linkage between the two driving levers, the interconnected shoe mechanism has four degrees of freedom.

(3) If the anchor joint and shoe joint are cylindrical pin and spherical joint respectively and there is a joint linkage between two driving levers of the two interconnected composite shoes, the interconnected shoe mechanism has three degrees of freedom, including a degree of freedom of roll about axis connecting the two spherical shoe joints; however, if there is not any linkage between the two driving levers, the interconnected shoe mechanism has four degrees of freedom.

(4) If the anchor joint and shoe joint are elliptical pin matching with cylindrical holes and cylindrical pin respectively and there is a joint linkage between two driving levers of the two interconnected composite shoes, the interconnected shoe mechanism has three degrees of freedom, including a degree of freedom of roll about axis connecting the two elliptical anchor joints; however, if there is not any linkage between the two driving levers, the interconnected shoe mechanism has four degrees of freedom.

(5) If the anchor joint and shoe joint are cylindrical pin and elliptical pin matching with cylindrical holes respectively and there is a joint linkage between two driving levers of the two interconnected composite shoes, the interconnected shoe mechanism has three degrees of freedom, including a degree of freedom of roll about axis connecting the two elliptical shoe joints; however, if there is not any linkage between the two driving levers, the interconnected shoe mechanism has four degrees of freedom.

Each driving lever of the interconnected shoe mechanism has two limbs to house other parts between them. One driving lever is housed inbetween the two limbs of the other driving lever, and webs of the shoes are housed further inbetween the limbs of the inner driving lever. There are several holes in each driving lever to mate with anchor joint pin, shoe joint pin, clearance adjusting pin and slide blocks, to prevent interferences among the parts, and for fixation of other parts.

The joint linkage between two driving levers of the two interconnected composite shoes is a slide joint mechanism consisting of a cylindrical pin connecting the two limbs of one driving lever and two slide blocks in oblong holes in the limbs of the other driving lever. The pin passes through holes in the slide blocks which can slide freely along the long sides of the oblong holes. This enable the two driving levers having the same radial displacement at the joint and not interfering in the circumferential direction. The function of the joint linkage between two driving levers of the two interconnected composite shoes is, together with the shoe interconnection mechanism, to ensure better uniformity of pressure distribution over the linings at different coefficients of friction and effectively improve the anti-fade performance of brakes.

One of the shoes of the interconnected shoe mechanism has single web, and the other shoes has double webs. The single web and the double webs are in overlap at their adjacent ends, and the single web is inserted between the double webs, where a shoe interconnection mechanism is formed with a joint pin fixed in holes in the double webs and a slide block in a oblong hole in the single web. The pin passes through hole in the slide block which can slide freely along the long sides of the oblong hole. This enables the two shoes having the same radial displacement at the joint and not interfering to each other in circumferential direction. The function of the shoe interconnection mechanism is to counteract the rotating tendency of each shoe about its joint and effectively improve the uniformity of pressure distribution over the linings.

The automatic clearance adjusting mechanism consists of a friction plate, a pin, a shaft and a spring, etc. The friction plate is fitted on backplate with the shaft. The spring is used to develop the friction force between friction plate and backplate. The one end of the pin is fixed on the friction plate, and its other end is housed in a slot in a limb of the outer driving lever, with which the automatic clearance adjusting mechanism is interconnected with the interconnected shoe mechanism. It can maintain the required clearance between the linings and drum especially when lining wear occurs. This type of drum brake and its variants have excellent braking performance in capacity and stability owing to its uniform pressure distribution over the friction surface between drum and linings, better resistance to capacity fade with decreasing coefficient of fiction due to increasing temperature or humidity, longer life span of shoes, uniform and constant clearance between drum and linings, as well as high shoe factor. They offer the better prospects of solution of existing problems in the vehicle brakes. The details are as follows.

(1) The new brakes of this invention are of high performances in capacity and stability. At normal coefficient of friction (for instance, 0.4), the shoe factor of the new brakes is close to that of the traditional duo-servo brake; when coefficient of friction decreases to a low value (say, 0.2) due to high temperature or humidity, the new brakes can still keep a quite high shoe factor close to that of traditional duplex brake at normal coefficient of friction.

(2) The new brakes of this invention can increase shoe service life remarkably. At all realistic coefficients of friction, the pressure distribution over each shoe of the new brakes can be very uniform, and the service life of all shoes can be almost equal.

(3) The new brakes of this invention have a new type of brake clearance adjusting mechanism which is reliable to keep the braking performance stable.

(4) The interconnected shoe mechanism of the new brakes of this invention are easier to match the multi-circuit brake actuating systems and can further help greatly improve safety and braking stability of motor vehicles.

(5) The multi-degrees-of-freedom composite shoes of the new brakes of this invention are self-adaptable to inner surface of brake drum. They can ensure complete contact between each lining and drum and prevent from the mechanical fade of brakes.

(6) Owing to the insensitivity of the braking performance of the new brakes of this invention to wear of shoes, deformation of drum and shoes, etc., the difference of braking torques between left and right side wheels of a vehicle shall be remarkably reduced, and therefore the directional stability during braking of vehicles shall be greatly improved.

(7) The new brakes of this invention are of equally excellent braking performance when vehicles run forwards and backwards.

BRIEF DESCRIPTION OF THE DRAWINGS

The present invention will be better understood from the following description of preferred embodiment of the invention taken with the appended drawings, in which

FIGS. 8(*c*) and (*d*) show spherical shoe joints;

FIGS. 9(*c*) and (*d*) show elliptical shoe joints;

FIG. 10(*b*) is the exploded view of the assembly of the interconnected shoe mechanism, the automatic clearance adjusting mechanism and the backplate in FIG. 10(*a*).

DETAILED DESCRIPTION OF THE INVENTION

Figure 1:
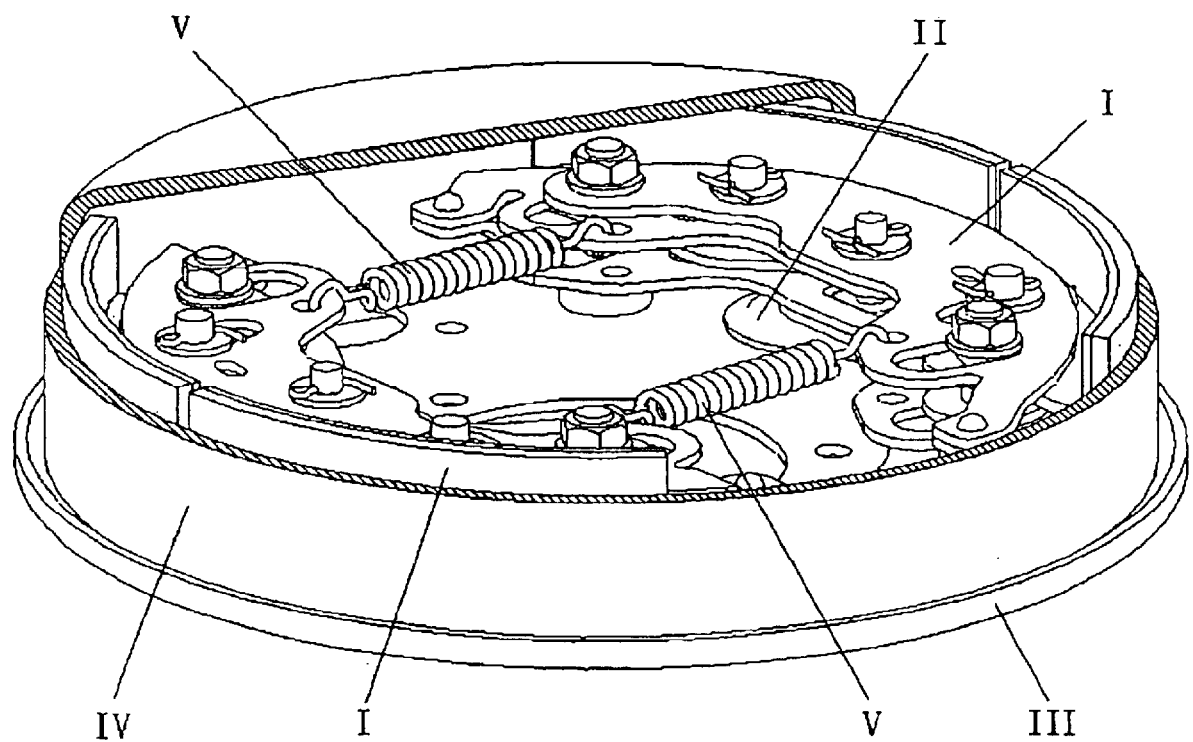
FIG. 1 is a drum brake of the present invention having the interconnected multi-degrees-of-freedom shoes and automatic adjusting mechanism of brake clearance.
Figure 2:
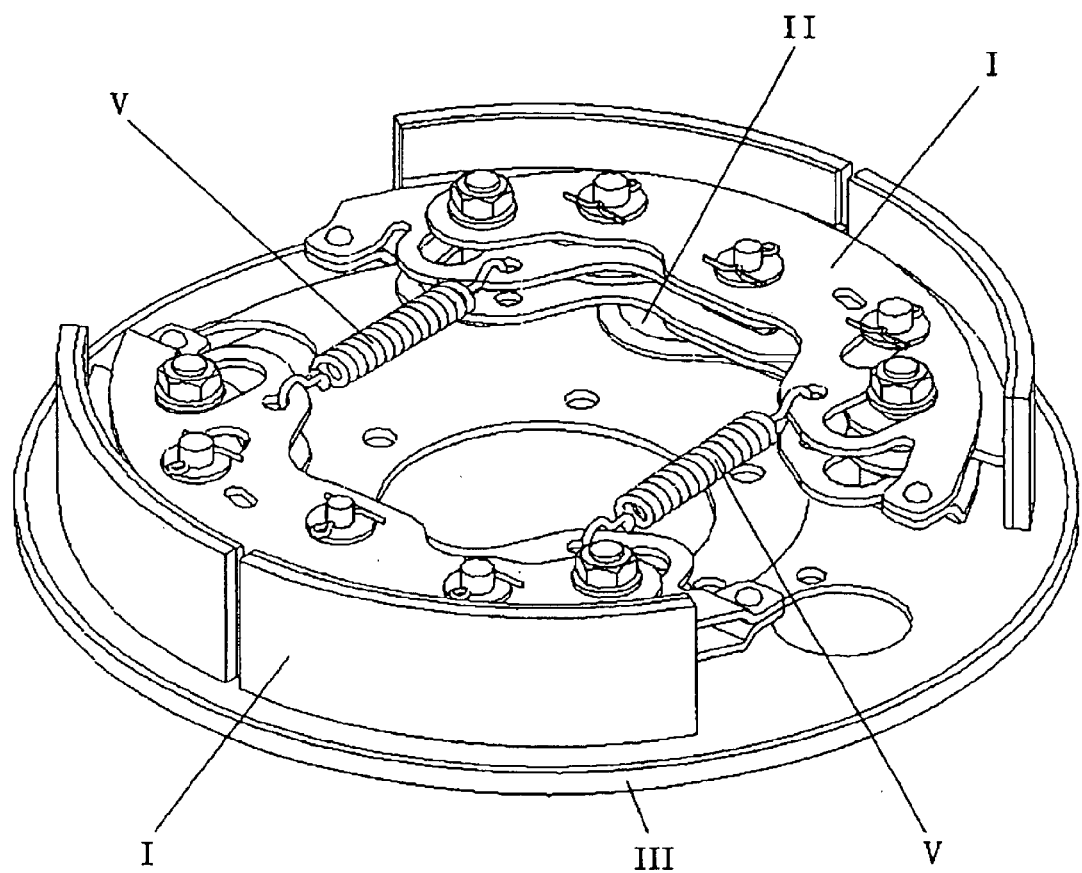
FIG. 2 is the brake assembly, without drum, of the present invention in FIG. 1.
Figure 7:
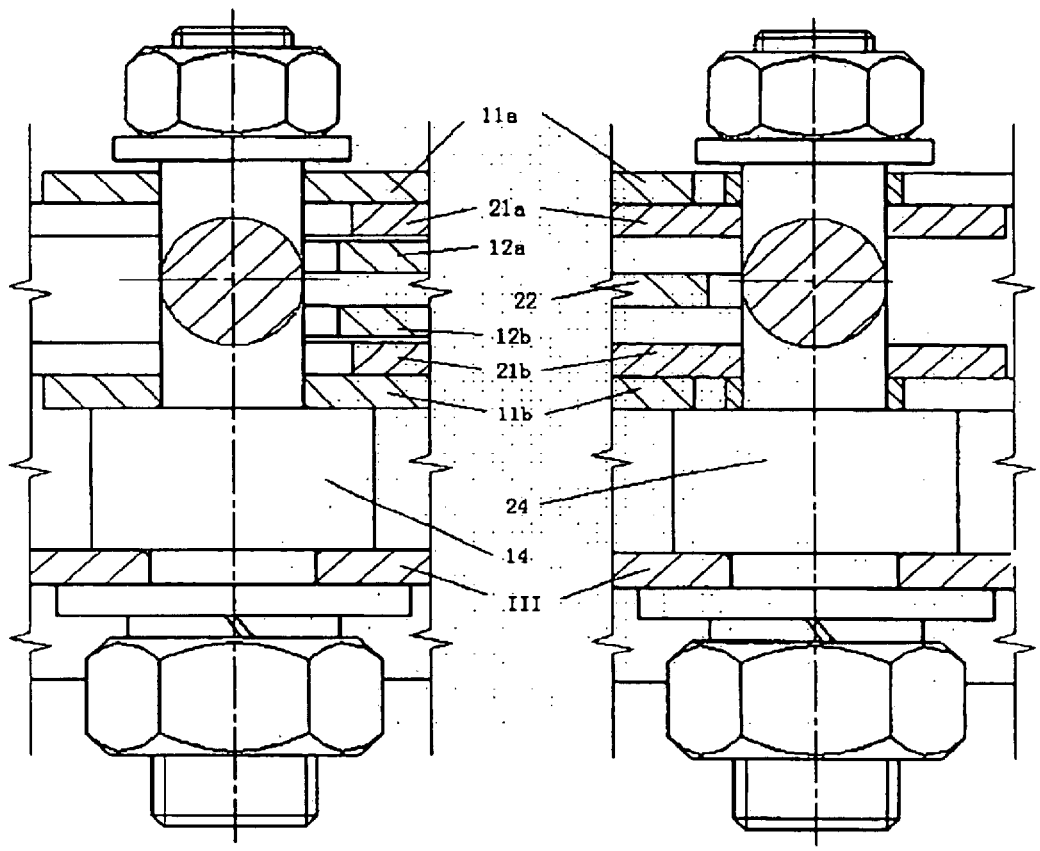
FIGS. 7(a) and (b) show cylindrical anchor joints.
FIGS. 7(c) and (d) show cylindrical shoe joints.
Figure 7:
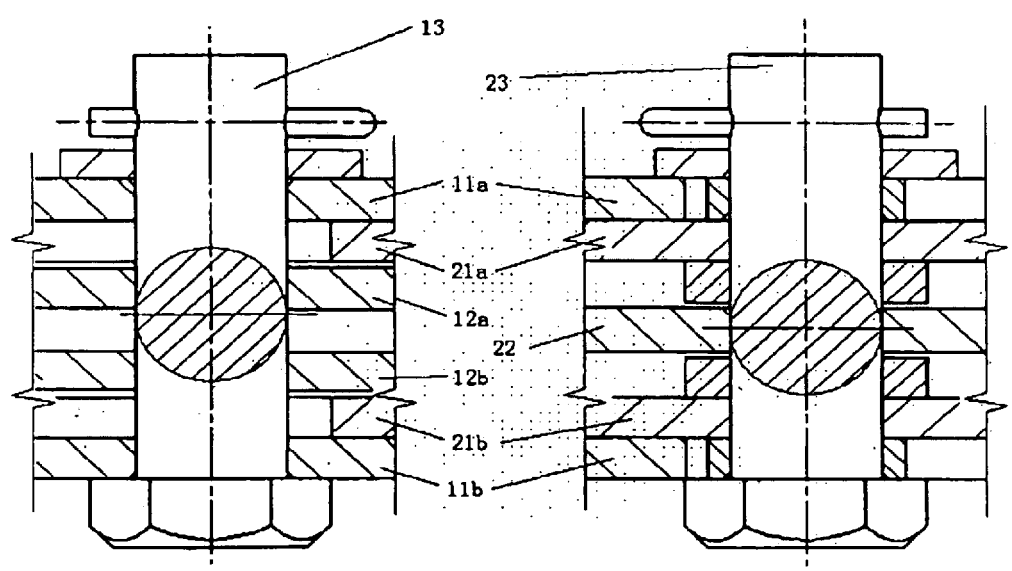
Figure 10:
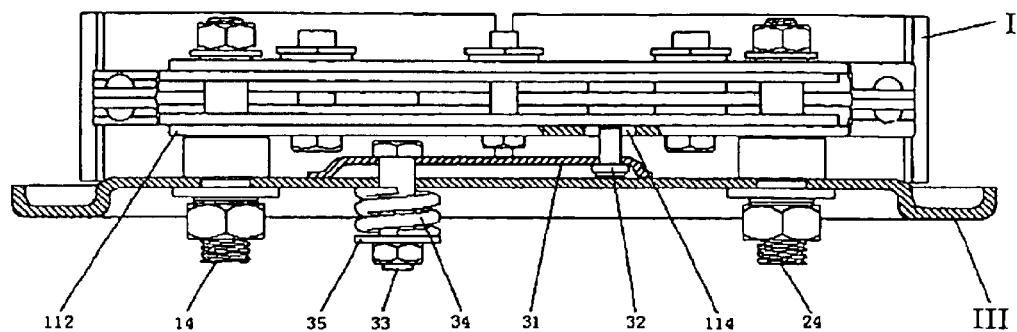
FIG. 10(*a*) shows assembly of the interconnected shoe mechanism, the automatic clearance adjusting mechanism and the backplate in FIG. 1.
Figure 10:
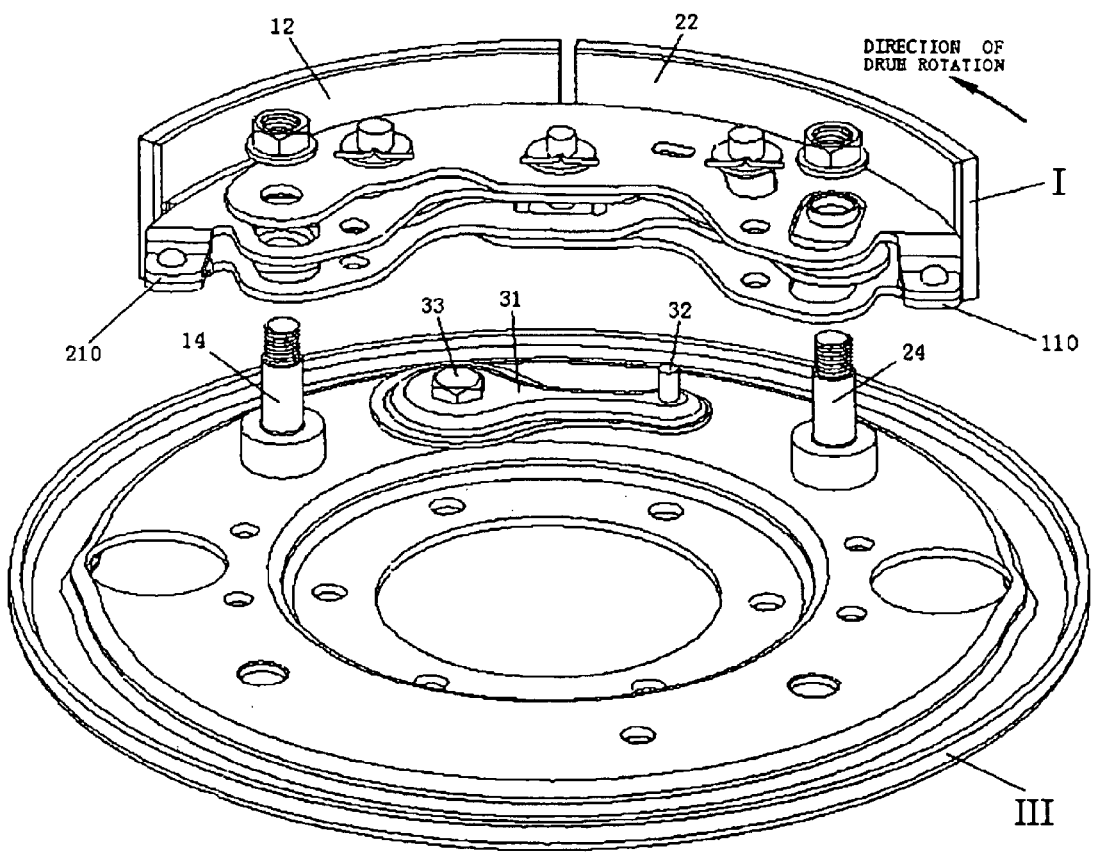

A type of drum brake of the present invention having the interconnected shoe mechanism of two degrees of freedom according to an embodiment of the invention will be described hereunder with reference to FIG. 1 and FIG. 2. This type of drum brake consists of two sets of interconnected shoe mechanisms I, two sets of automatic clearance adjusting mechanisms II, backplate III, drum IV and two pull-off springs V. A parking brake mechanism can also be exerted in the assembly when necessary. One interconnected shoe mechanism I is pivoted on one side of backplate III by cylindrical anchor pins 14 and 24. See FIGS. 7(*a*) and 7(*b*). One automatic clearance adjusting mechanism is fitted on the same side. A friction plate 31 is fixed on backplate III by shaft 33, and pin 32 is fixed on friction plate 31, the tip of which is housed in slot 114 on limb 11*b* of outer driving lever 11, as shown in FIG. 10. The other interconnected shoe mechanism and its automatic clearance adjusting mechanism are fitted on the other side of backplate III in the same way as above. Because the two sets of interconnected shoe mechanism and automatic clearance adjusting mechanism are completely same, only one of them is described hereunder.

Figure 3:
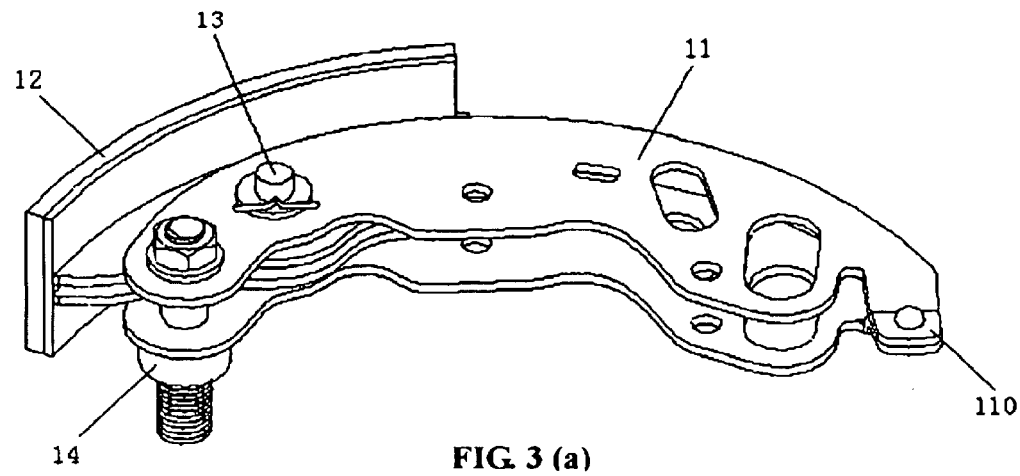
FIG. 3(a) shows subassembly of a composite shoe in FIG. 1.
FIG. 3(b) is the exploded view of the composite shoe in FIG. 3(a).
Figure 3:
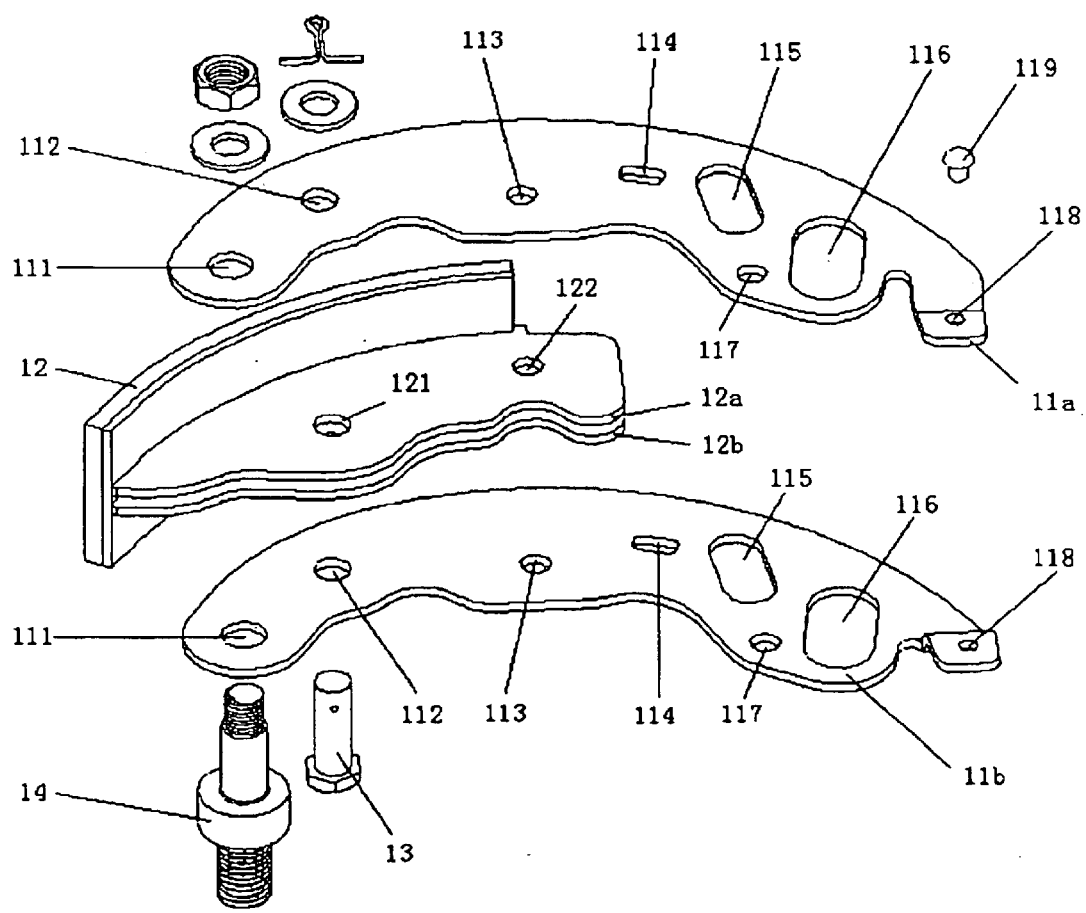
Figure 4A:
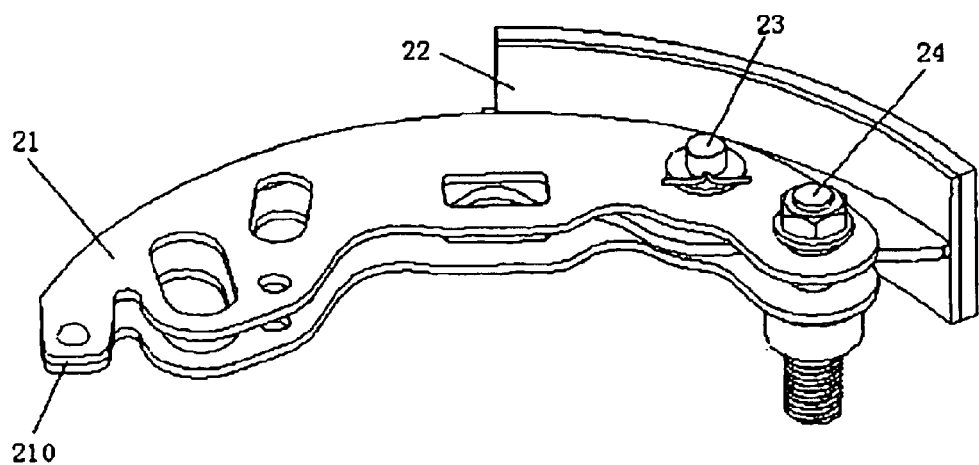
FIG. 4(a) shows subassembly of the other composite shoe in FIG. 1.
Figure 4:
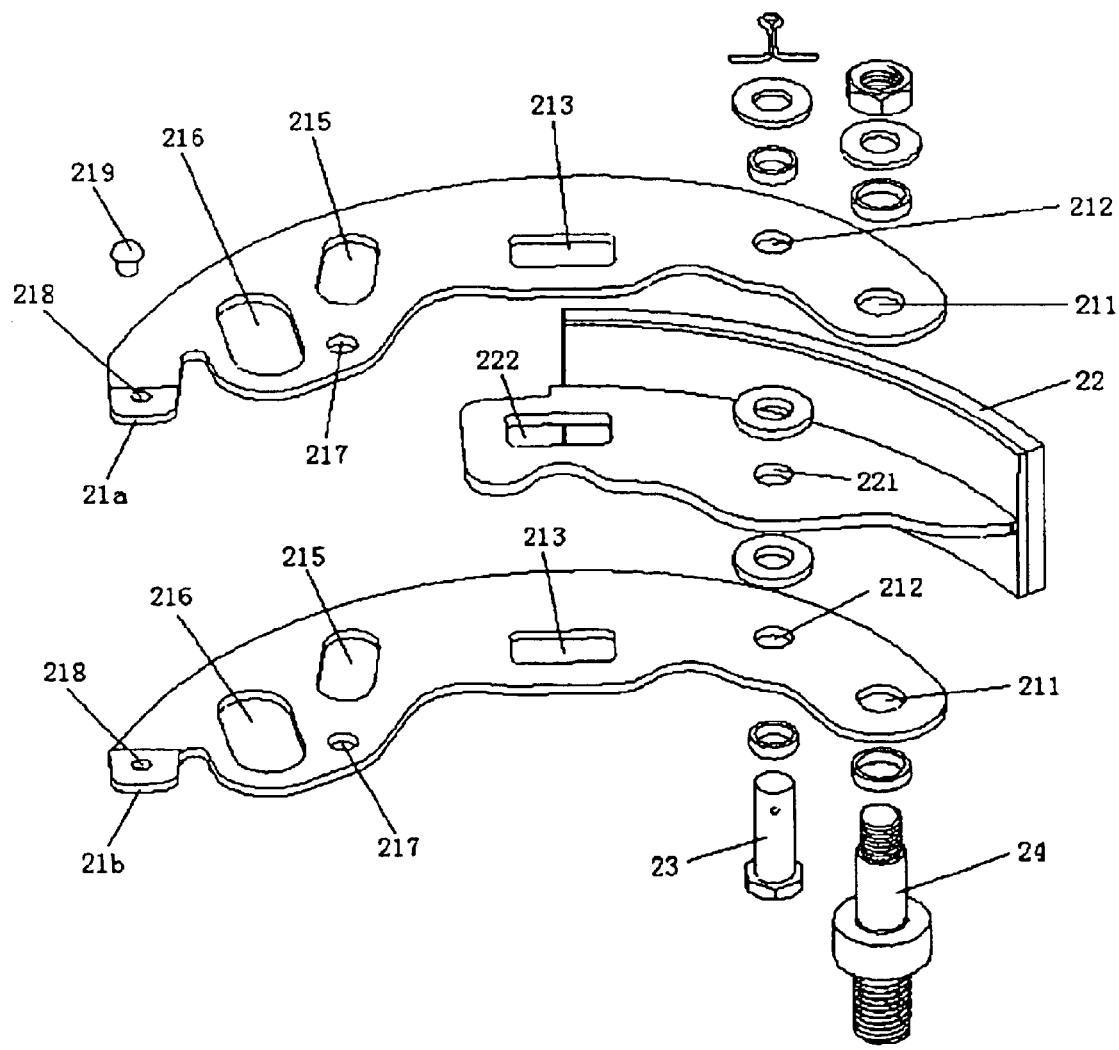
FIG. 4(b) is the exploded view of the composite shoe in FIG. 4(a).
Figure 5:
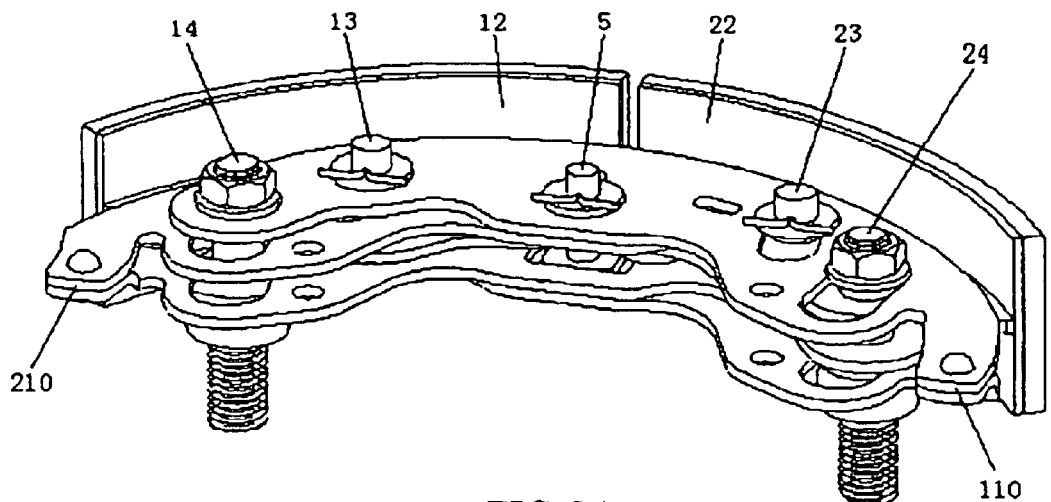
FIG. 5(a) shows subassembly of the interconnected shoe mechanism I in FIG. 1.
FIG. 5(b) is the exploded view of the interconnected shoe mechanism in FIG. 5(a).
Figure 5:
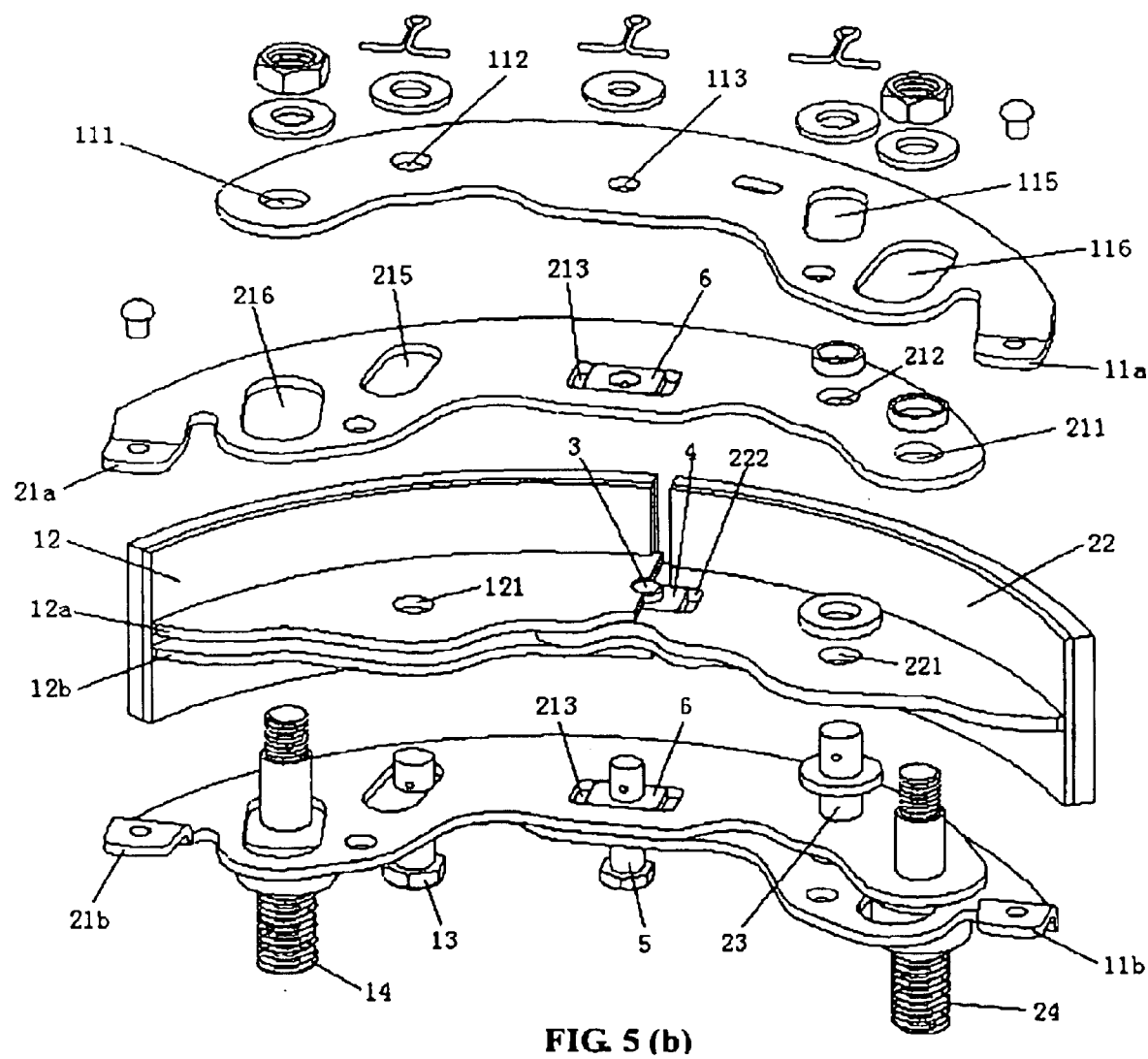

In FIGS. 3(*a*) and (*b*), a composite shoe consists of shoe 12 and driving lever 11. The shoe 12 is jointed to driving lever 11 with cylindrical pin 13, see FIG. 7(*c*), and can rotate about pin 13, and the driving lever 11 is pivoted on backplate III with cylindrical anchor pin 14. Similarly, the other composite shoe in FIGS. 4(*a*) and (*b*) consists of shoe 22 and driving lever 21. The shoe 22 is jointed to driving lever 21 with cylindrical pin 23, see FIG. 7(*d*), and can rotate about pin 23, and the driving lever 21 is pivoted on backplate III with cylindrical anchor pin 24. The two composite shoes constitute the interconnected shoe mechanism I, and the shoes 12 and 22 are interconnected with a slide joint mechanism consisting of slide block 4 and cylindrical pin 3, as seen in FIGS. 5(*a*) and (*b*). Owing to the slide joint mechanism, the two shoes have the same radial displacement at the joint and do not interfere in the circumferential direction. The driving levers 11 and 21 are also interconnected with a slide joint mechanism consisting of cylindrical pin 5 and slide blocks 6, and the pin 5 passes through holes 113 in driving lever 11 and the holes in slide blocks 6. The slide blocks 6 can slide in oblong holes 213 in driving lever 21, and the two driving levers have the same radial displacement at the joint and do not interfere in the circumferential direction. So the interconnected shoe mechanism has two degrees of freedom. If the slide joint between driving levers 11 and 21 is cancelled, see FIGS. 6(*a*) and 6(*b*), the interconnected shoe mechanism would have three degrees of freedom.

Figure 6:
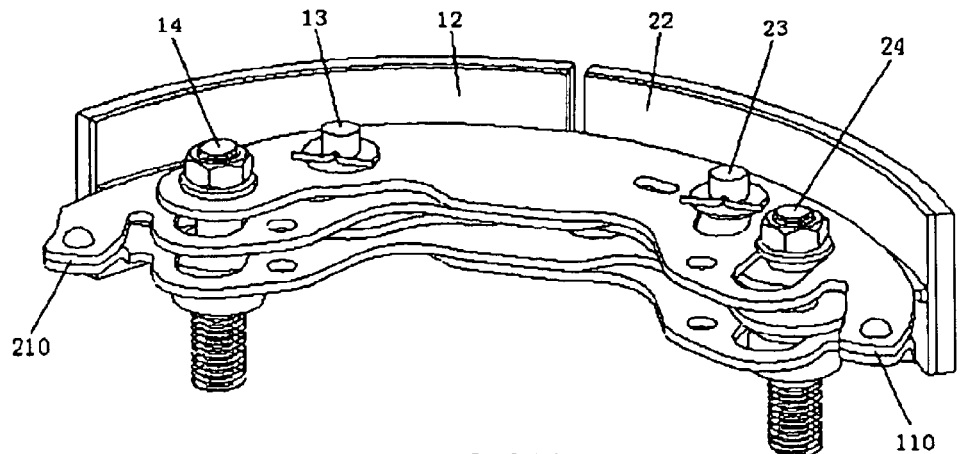
FIG. 6(a) shows subassembly of the interconnected shoe mechanism without any linkage between the first and second driving levers.
FIG. 6(b) is the exploded view of the interconnected shoe mechanism in FIG. 6(a)
Figure 6:
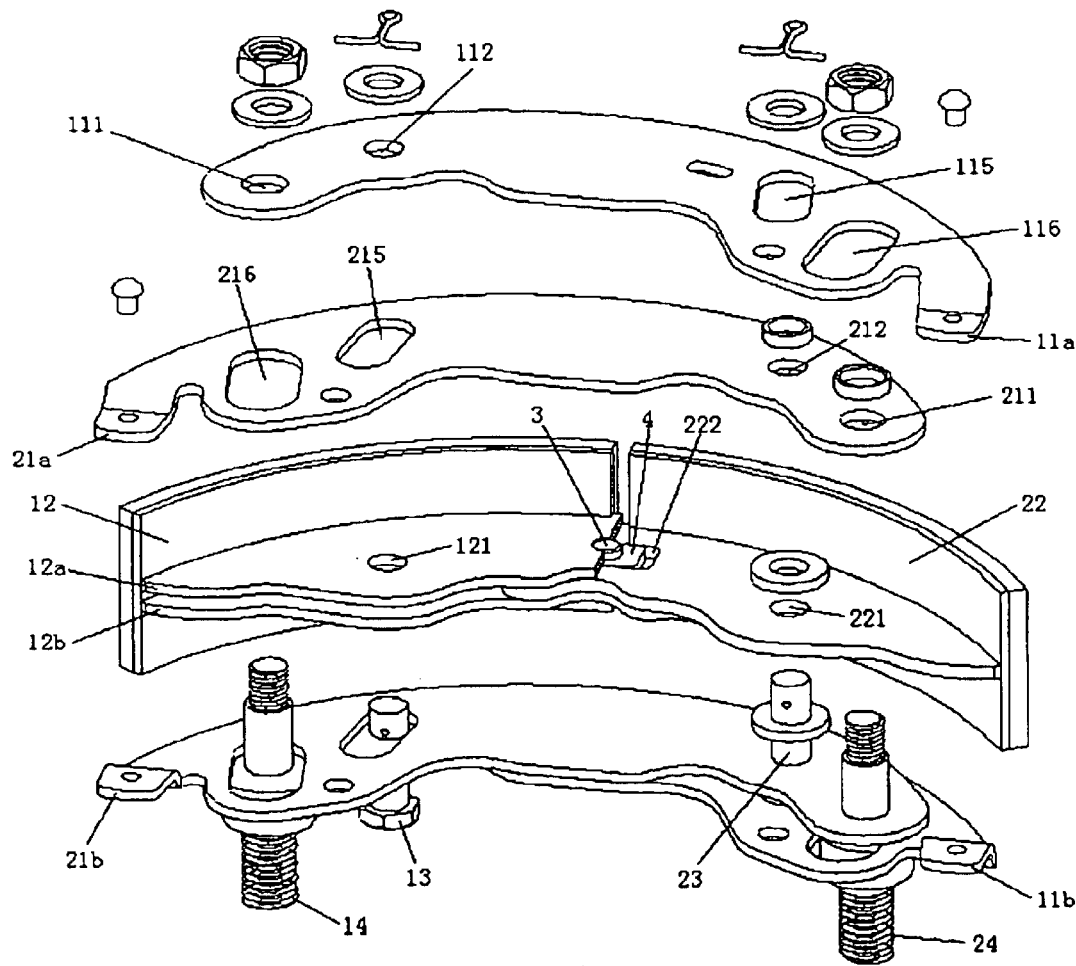
Figure 8:
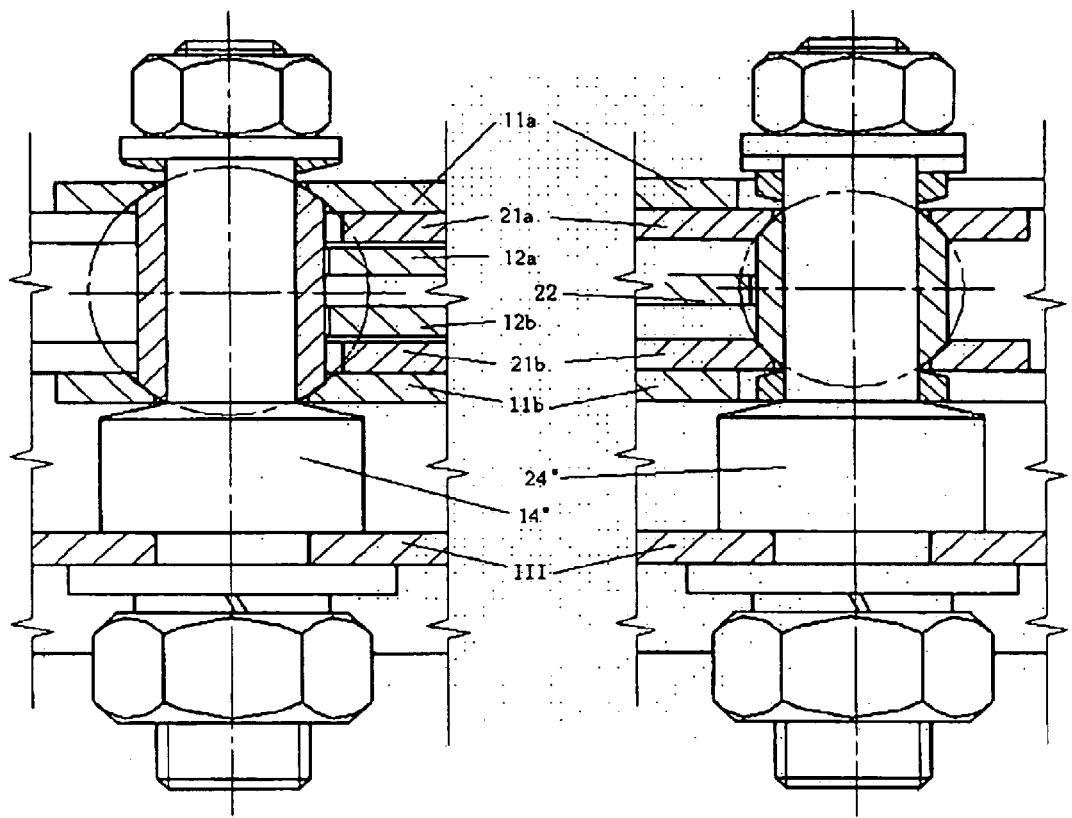
FIGS. 8(*a*) and (*b*) show spherical anchor joints.
Figure 8:
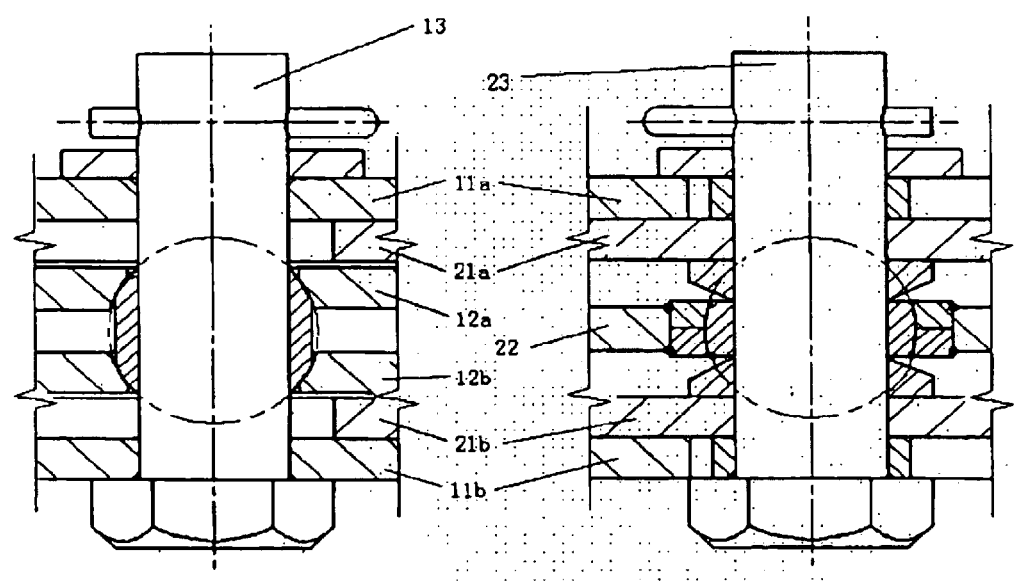

In FIGS. 5(*a*) and (*b*), if the anchor pins 14 and 24 are replaced by spherical joints, see FIGS. 8(*a*) and 8(*b*), the interconnected shoe mechanism would have three degrees of freedom, including a degree of freedom of roll about axis connecting the two spherical anchor joints; if the slide joint between driving levers 11 and 21 is cancelled, see FIGS. 6(*a*) and 6(*b*), the interconnected shoe mechanism would have four degrees of freedom.

In FIGS. 5(*a*) and (*b*), if the shoe joint's cylindrical pins 13 and 23 are replaced by spherical joints, see FIGS. 8(*c*) and 8(*d*), the interconnected shoe mechanism would have three degrees of freedom, including a degree of freedom of roll about axis connecting the two spherical shoe joints; if the slide joint between driving levers 11 and 21 is cancelled, see FIGS. 6(*a*) and 6(*b*), the interconnected shoe mechanism would have four degrees of freedom.

Figure 9:
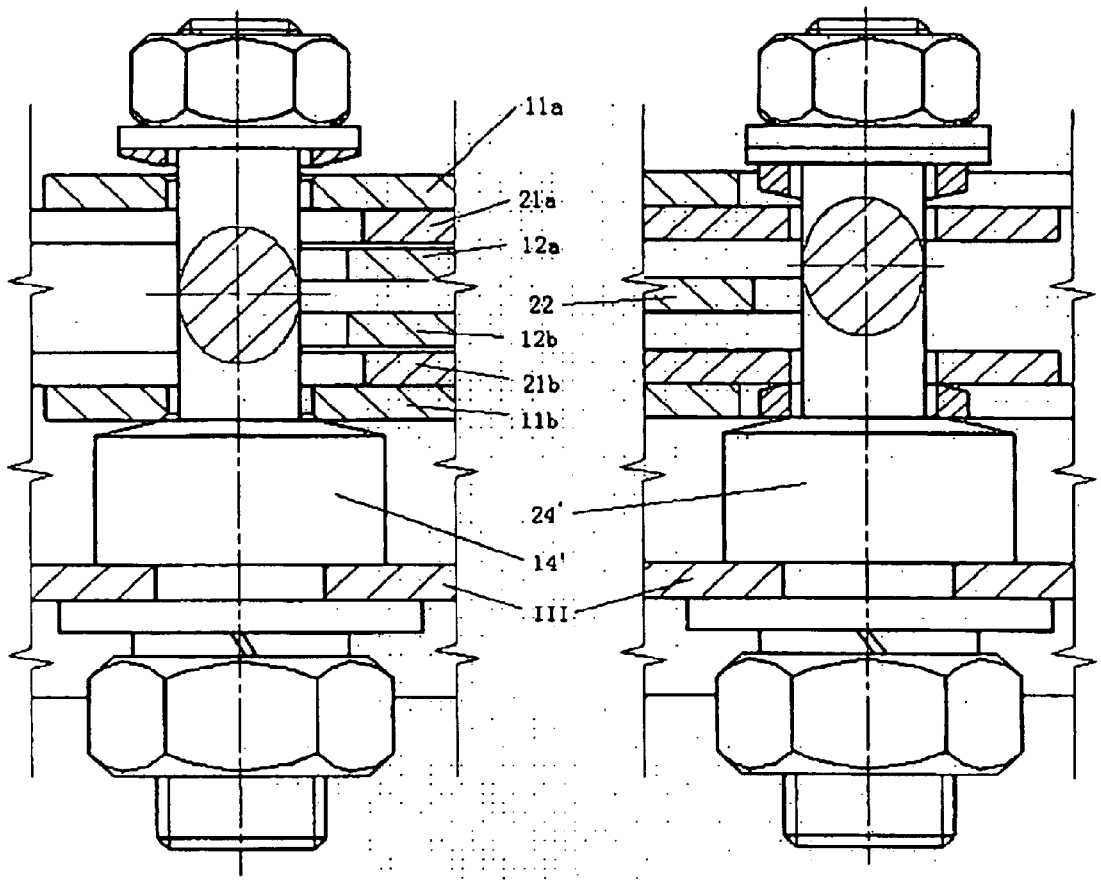
FIGS. 9(*a*) and (*b*) show elliptical anchor joints.
Figure 9:
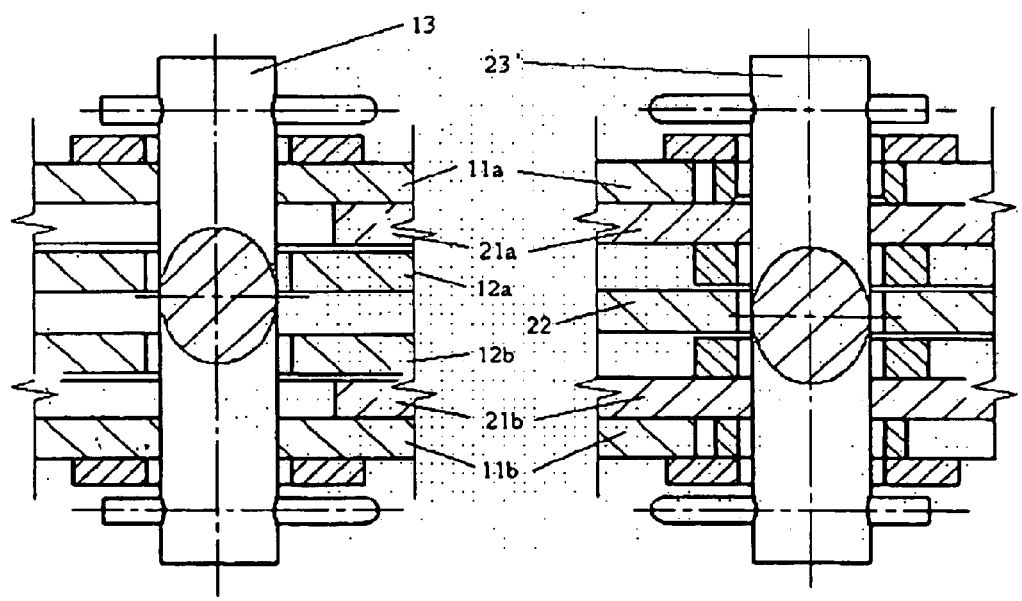

In FIGS. 5(*a*) and (*b*), if the cylindrical anchor pins 14 and 24 are replaced by elliptical pins, see FIGS. 9(*a*) and 9(*b*), the interconnected shoe mechanism would have three degrees of freedom, including a degree of freedom of roll about axis connecting the two elliptical anchor joints; if the slide joint between driving levers 11 and 21 is cancelled, see FIGS. 6(*a*) and 6(*b*), the interconnected shoe mechanism would have four degrees of freedom.

In FIGS. 5(*a*) and (*b*), if the shoe joint's cylindrical pins 13 and 23 are replaced by elliptical pins, see FIGS. 9(*c*) and 9(*c*), the interconnected shoe mechanism would have three degrees of freedom, including a degree of freedom of roll about axis connecting the two elliptical shoe joints; if the slide joint between driving levers 11 and 21 is cancelled, see FIGS. 6(*a*) and 6(*b*), the interconnected shoe mechanism would have four degrees of freedom.

Each driving lever of the interconnected shoe mechanism has two limbs to house other parts inbetween them. In FIGS. 3(*a*) and (*b*), driving lever 11 has two limbs, 11*a* and 11*b*, the rivet 119 rivets limbs 11*a* and 11*b* through holes 118. In FIGS. 4(*a*) and (*b*), the driving lever 21 has also two limbs, 21*a* and 21*b*, the rivet 219 rivets limbs 21*a* and 21*b* through holes 218. The driving lever 21 is housed inbetween limb 11*a* and 11*b*, and the webs of shoes 12 and 22 are housed inbetween limb 21*a* and 21*b*. The driving levers 11 and 21 are arranged in the opposite direction to each other, and there is a certain distance between anchor pins 14 and 24; the tip 110 of driving lever 11 and the anchor pin 24 of driving lever 21 are in one side, and the tip 210 of driving lever 21 and the anchor pin 14 of driving lever 11 are in the other side. There are several holes in each driving lever, as seen in FIGS. 3(*a*) and (*b*), hole 111 mating with anchor pin 14, hole 112 mating with shoe joint pin 13, and hole 113 mating with cylindrical pin 3 (as also seen in FIGS. 5(*a*) and (*b*)). There are holes 115 and 116 in driving lever 11 for shoe joint pin 23 and anchor pin 24 not to interfere with driving lever 11 when the latter rotates about anchor pin 14. As seen in FIGS. 4(*a*) and (*b*), hole 211 mates with anchor pin 24, hole 212 mates with shoe joint pin 23, and oblong holes 213 mate with the slide blocks 6 (as seen in FIGS. 5(*a*) and (*b*)). There are also holes 215 and 216 in driving lever 21 for shoe joint pin 13 and anchor pin 14 not to interfere with driving lever 21 when the latter rotates about anchor pin 24. In addition, there are still holes 117 and 217 for the pull-off springs to connect with, and there is a slot 114 to limb 11*b* for the tip of pin 32 to be housed in (as seen in FIGS. 10(*a*) and (*b*)). The details about slot 114 will be described in a separate section.

In FIGS. 5(*a*) and (*b*), it is necessary for shoe 12 to have double webs and for shoe 22 to have single web. As thus, it is easy for the two shoes to be interconnected by means of a mechanism consisting of cylindrical pin 3 and slide block 4. In the overlap part of the webs of shoes 12 and 22, the single web of shoe 22 is inserted between the double webs 12a and 12b. The hole 122 mating with joint pin 3 is in the double webs of shoe 12, and the oblong hole 222 mating with slide block 4 is in the single web of shoe 22. Thus, the slide block 4 inbetween the double webs of shoe 12 can not slide out of the oblong hole 222. This enables shoes 12 and 22 having the same radial displacement at the joint and not interfering to each other in circumferential direction as the slide block 4 can slide freely along the long sides of oblong hole 222. In addition, there is a hole 121 in the webs of shoe 12 for cylindrical pin 13 to mate with, and there is a hole 221 in the web of shoe 22 for cylindrical pin 23 to mate with.

In FIGS. 10(a) and (b), when forces are applied to tip 110 of driving lever 11 and/or tip 210 of driving lever 21 to drive the driving levers outwards, the driving levers move and load shoes 12 and 22 against the drum IV. Normal forces are established then on the friction surfaces between drum and linings, and the resulting tangential friction force on drum slows down the drum IV. At the same time, the moments making the shoes rotate about their joint are developed. For instance, when the drum rotates in the counterclockwise direction, the resulting tangential friction force on each shoe tends to cause shoe 12 to rotate about cylindrical pin 13 and shoe 22 to rotate about cylindrical pin 23 in the counterclockwise direction. Therefore, the interconnecting mechanism between the two shoes is adopted for counteracting the rotating tendencies of the shoes to improve effectively the uniformity of pressure distribution over the linings.

The automatic clearance adjusting mechanism consists of friction plate 31, pin 32, shaft 33 and spring 34, etc. The friction plate 31 is fitted on backplate III with shaft 33. The pin 32 is fixed on the friction plate 31, and its tip is housed in slot 114 in limb 11b of outer driving lever 11. The spring 34 is used to develop the friction force between friction plate 31 and backplate III. When the brake is released, the gap between pin 32 and a long side of slot 114 allows the driving levers free to take the shoes back from drum IV, and the long side of slot 114 is held hard against pin 32 by means of the pull-off springs V connecting the driving levers, without rotation of friction plate 31 relative to backplate III. While brake is applied with the driving levers moving the shoes outwards against drum IV, friction plate 31 shall be overcoming the friction force between friction plate 31 and backplate III and rotating about shaft 33 to maintain the required clearance between drum and linings, if lining wear occurs.

The embodiment of the present invention has been disclosed for illustration purposes. The appended claims are intended to cover inventive features in the disclosed embodiment and the variants or modifications of the inventive features believed to be within the spirit of the invention.

What is claimed is:

1. A drum brake comprising:
   a drum,
   a backplate,
   at least one interconnected shoe mechanism and an automatic adjusting mechanism for adjusting brake clearance; the interconnected shoe mechanism comprising a first composite shoe and a second composite shoe each having multiple degrees of freedom, the first composite shoe comprising a first shoe and a first driving lever and the second composite shoe comprising a second shoe and a second driving lever, wherein the first and second shoes are rotatably joined to respective first and second driving levers at respective first and second shoe joints; the first and second driving levers each being pivotally supported on the backplate at respective first and second anchor joints; wherein the first and second driving levers of the first and second composite shoes are arranged in the directions opposite to each other, a tip of the first driving lever and the second anchor joint being located on a same side and a tip of the second driving lever and the first anchor joint being located on an opposing side, and the first and second anchor joints being separated by a distance; and
   a slide joint mechanism for interconnecting the first and second shoes of the first and second composite shoes at their adjacent ends to maintain the first and second shoes at the same radial displacement at the slide joint mechanism and allowing limited free movement in a circumferential direction; the automatic adjusting mechanism being fixed on the backplate and interconnected with the first or second driving lever to keep substantially constant clearance between the first and second shoes and the drum as linings of the first and second shoes wear.

2. A drum brake as set forth in claim 1, wherein said interconnected shoe mechanism has three degrees of freedom, both said first and second anchor joints of the driving levers and said first and second shoe joints comprising cylindrical pins and without any linkage between the first and second driving levers.

3. A drum brake as set forth in claim 1, wherein said interconnected shoe mechanism has two degrees of freedom, both said first and second anchor joints of the driving levers and said first and second shoe joints comprising cylindrical pins and with a joint linkage between the first and second driving levers of the two composite shoes.

4. A drum brake as set forth in claim 3, wherein said joint linkage between the first and second driving levers of the interconnected first and second composite shoes is the slide joint mechanism, the slide joint mechanism comprising a cylindrical pin connecting two limbs of one of the first and second driving levers and two slide blocks in oblong holes in limbs of the other of the first and second driving levers, said pin passing through holes in said slide blocks and said slide blocks being able to slide freely along long sides of the oblong holes; enabling the first and second driving levers to maintain similar radial displacement at the joint linkage and allowing limited free movement in the circumferential direction.

5. A drum brake as set forth in claim 1, wherein said interconnected shoe mechanism has four degrees of freedom, including a degree of freedom of roll about an axis connecting the first and second anchor joints; wherein said first and second anchor joints comprise spherical joints, and said first and second shoe joints comprise cylindrical pins, without any linkage between the first and second driving levers of the first and second composite shoes.

6. A drum brake as set forth in claim 1, wherein said interconnected shoe mechanism has three degrees of freedom, including a degree of freedom of roll about an axis connecting the first and second anchor joints; wherein said first and second anchor joints of the first and second driving levers comprise spherical joints, and said first and second shoe joints comprise cylindrical pins, with a joint linkage between the first and second driving levers of the first and second composite shoes.

7. A drum brake as set forth in claim 6, wherein said joint linkage between the first and second driving levers of the two interconnected composite shoes comprises the slide joint mechanism, the slide joint mechanism comprising a cylindrical pin connecting two limbs of the first driving lever and two slide blocks in oblong holes in limbs of the second driving lever, said pin passing through holes in said slide blocks, and said slide blocks being able to slide freely along long sides of the oblong holes; enabling the first and second driving levers to maintain substantially the same radial displacement and allowing limited free movement in a circumferential direction.

8. A drum brake as set forth in claim 1, wherein said interconnected shoe mechanism has four degrees of freedom, including a degree of freedom of roll about an axis connecting the first and second shoe joints; wherein said first and second anchor joints of the first and second driving levers comprise cylindrical pins, and said first and second shoe joints comprise spherical joints, without any linkage between the first and second driving levers of the first and second composite shoes.

9. A drum brake as set forth in claim 1, wherein said interconnected shoe mechanism has three degrees of freedom, including a degree of freedom of roll about an axis connecting the first and second shoe joints; wherein said first and second anchor joints of the first and second driving levers comprise cylindrical pins, and said first and second shoe joints comprise spherical joints, with a joint linkage between the first and second driving levers of the first and second composite shoes.

10. A drum brake as set forth in claim 9, wherein said joint linkage between two driving levers of the two interconnected composite shoes comprises the slide joint mechanism, the slide joint mechanism comprising a cylindrical pin connecting two limbs of the first driving lever and two slide blocks in oblong holes in limbs of the second driving lever, said pin passing through holes in said slide blocks, and said slide blocks being able to slide freely along long sides of the oblong holes; enabling the first and second driving levers to maintain substantially the same radial displacement and allowing limited free movement in a circumferential direction.

11. A drum brake as set forth in claim 1, wherein said interconnected shoe mechanism has four degrees of freedom, including a degree of freedom of roll about an axis connecting the first and second anchor joints; wherein said first and second anchor joints of the first and second driving levers comprise elliptical pins matching with cylindrical holes, and said first and second shoe joints comprise cylindrical pins, without any linkage between the first and second driving levers of the first and second composite shoes.

12. A drum brake as set forth in claim 1, wherein said interconnected shoe mechanism has three degrees of freedom, including a degree of freedom of roll about an axis connecting the first and second anchor joints; wherein said first and second anchor joints of the first and second driving levers comprise elliptical pins matching with cylindrical holes, and said first and second shoe joints comprise cylindrical pins, with a joint linkage between the first and second driving levers of the first and second composite shoes.

13. A drum brake as set forth in claim 12, wherein said joint linkage between the first and second driving levers of the two interconnected composite shoes comprises the slide joint mechanism, the slide joint mechanism comprising a cylindrical pin connecting two limbs of the first driving lever and two slide blocks in oblong holes in limbs of the second driving lever, said pin passing through holes in said slide blocks, and said slide blocks being able to slide freely along long sides of the oblong holes; enabling the first and second driving levers to maintain substantially the same radial displacement and allowing limited free movement in a circumferential direction.

14. A drum brake as set forth in claim 1, wherein said interconnected shoe mechanism has four degrees of freedom, including a degree of freedom of roll about an axis connecting the first and second shoe joints; wherein said first and second anchor joints of the first and second driving levers comprise cylindrical pins, and said first and second shoe joints comprise elliptical pins matching with cylindrical holes, without any linkage between the first and second driving levers of the first and second composite shoes.

15. A drum brake as set forth in claim 1, wherein said interconnected shoe mechanism has three degrees of freedom, including a degree of freedom of roll about an axis connecting the first and second shoe joints; wherein said first and second anchor joints of the first and second driving levers comprise cylindrical pins, and said first and second shoe joints comprise elliptical pins matching with cylindrical holes, with a joint linkage between the first and second driving levers of the first and second composite shoes.

16. A drum brake as set forth in claim 15, wherein said joint linkage between the first and second driving levers of the two interconnected composite shoes comprises the slide joint mechanism, the slide joint mechanism comprising a cylindrical pin connecting limbs of the first driving lever and two slide blocks in oblong holes in limbs of the second driving lever, said pin passing through holes in said slide blocks, and said slide blocks being able to slide freely along the long sides of the oblong holes; enabling the first and second driving levers to maintain substantially the same radial displacement and allowing limited free movement in a circumferential direction.

17. A drum brake as set forth in claim 1, wherein each said first and second driving lever of the interconnected shoe mechanism has two limbs spaced apart and the first and second shoes comprising webs, the two limbs of the said first driving lever being housed in between the two limbs of the second driving lever, and webs of the first and second shoes being housed further in between the limbs of the first driving lever.

18. A drum brake as set forth in claim 1, wherein the first shoe comprises a single web, and the second shoe comprises a double web, the single web and the double web being in overlap at adjacent ends thereof, and the single web being interdigitated within the double web.

19. A drum brake as set forth in claim 18, wherein said interconnected shoe mechanism further comprises a joint pin fixed in holes in the double web and a slide block in an oblong hole in the single web, said joint pin passing through a hole in said slide block, said slide block being able to slide freely along long sides of the oblong hole; enabling the first and second shoes to maintain substantially the same radial displacement and allowing limited free movement in a circumferential direction.

20. A drum brake as set forth in claim 1, wherein said automatic adjusting mechanism comprises a friction plate, a shaft, a pin and a spring, said friction plate being fitted on said backplate with said shaft, said spring biasing said friction plate toward said backplate; a first end of said pin being fixed to said friction plate, and a second end of said pin being operably connected to the second driving lever.

* * * * *